(12) United States Patent
Pikesh

(10) Patent No.: US 7,208,025 B2
(45) Date of Patent: Apr. 24, 2007

(54) METHOD AND APPARATUS FOR FILTERING AIR PASSAGES IN AN ALTERNATOR

(75) Inventor: Derryn William Pikesh, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 246 days.

(21) Appl. No.: 10/886,381

(22) Filed: Jul. 7, 2004

(65) Prior Publication Data

US 2006/0005516 A1   Jan. 12, 2006

(51) Int. Cl.
*B01D 45/02* (2006.01)

(52) U.S. Cl. .................... 55/385.3; 55/300; 55/361; 55/378; 55/379; 55/363; 55/366; 123/198 E

(58) Field of Classification Search .......... 55/300, 55/361, 378, 379, 385.3, 366, 363; 123/198 E
See application file for complete search history.

(56) References Cited

U.S. PATENT DOCUMENTS

| | | | | |
|---|---|---|---|---|
| 4,089,664 A | * | 5/1978 | Noland | 55/341.1 |
| 4,141,128 A | * | 2/1979 | Wonderling | 29/896.62 |
| 4,276,069 A | * | 6/1981 | Miller | 55/379 |
| 4,358,303 A | | 11/1982 | Rakow | |
| 5,407,570 A | * | 4/1995 | Hobson, Jr. | 210/232 |
| 5,690,710 A | * | 11/1997 | Stephan | 55/366 |
| 6,051,138 A | * | 4/2000 | Hobson, Jr. | 210/323.2 |
| 6,309,552 B1 | * | 10/2001 | Hobson, Jr. | 210/791 |
| 6,991,665 B1 | * | 1/2006 | Allen et al. | 55/379 |

* cited by examiner

*Primary Examiner*—Minh-Chau T. Pham
(74) *Attorney, Agent, or Firm*—Michael G. Harms; John William Stader; Stephen A. Bucchiancri

(57) ABSTRACT

A filter to clean the air entering an alternator in a vehicle used in a dirty environment such as a crop harvesting machine includes a mesh filter which is coupled to an air intake of the alternator. The filter is constructed of a mesh material which is flexible and includes relatively small apertures. The apertures prevent chaff and other extraneous material from entering the alternator, while allowing air to flow freely into the alternator, preventing overheating. The flexible mesh sleeve can be vibrated during operation, as, for example, by the flow of air from the engine fan, to provide a self cleaning function in which the vibration causes extraneous material to be shook from the filter.

23 Claims, 5 Drawing Sheets

METHOD AND APPARATUS FOR FILTERING AIR PASSAGES IN AN ALTERNATOR

BACKGROUND OF THE INVENTION

This invention relates generally to alternator filters and, more particularly, concerns self-cleaning alternator filters for use in dirty environments.

Alternators are used to supply electrical energy to an array of vehicles including rugged off-road construction and agricultural equipment. When used in the dirty environments associated with this type of equipment, however, the cooling air passages in the alternator can become blocked by foreign matter, causing the alternator to overheat, decreasing the efficiency and output of the alternator, and ultimately resulting in the failure of the alternator. Moreover, in these types of vehicles, the alternators are typically located at fairly inaccessible positions, and therefore are both time consuming and inefficient to remove and repair.

To limit overheating problems caused by clogged cooling passages, therefore, alternators operated in "dirty" environments are typically equipped with screens designed to prevent the entrance of foreign matter into the alternator cooling passages. While these screens are useful in limiting blocking of the alternator, after the vehicles have been used for a number of hours the screens themselves often become clogged, thereby cutting off all air flow to the alternators cooling passages. The result of the clogged screen is substantially the same as the clogged passages, resulting in overheating and eventual failure of the alternator as discussed above. While it is possible to clean the stationary alternators, again, the alternators are typically located at fairly inaccessible positions within the vehicle, and therefore it is both time consuming and inefficient to clean the screens manually.

A need remains, therefore, for a filtering system for an alternator for off-road vehicles and vehicles used in dirty environments.

BRIEF SUMMARY OF THE INVENTION

In one aspect the present invention provides a method for filtering air entering an alternator. A filter support is coupled to an air intake of the alternator extending away from the air intake, and an elongate flexible mesh sleeve is coupled to the filter support such that the elongate flexible mesh sleeve encloses the air intake. The mesh is sized and dimensioned to limit entry of extraneous material to the alternator. The flexible filter is vibrated in operation to force filtered material loose from the filter sleeve, thereby limiting or preventing clogging of the filter, and maintaining a flow of air through the alternator during use. In one embodiment of the invention, for example, the vibration of the mesh filter is provided by air flow from an engine fan in the engine compartment.

In another aspect of the invention, a self-cleaning filter for an alternator air intake is provided. The filter comprises an elongate filter support sized and dimensioned to be received on the alternator air intake and extending away from the air intake and an elongate flexible sleeve having an open end sized and dimensioned to be received on the elongate support and over the air intake of the alternator, and an opposing closed end. The elongate flexible sleeve is constructed of a mesh filter material having apertures which are sized and dimensioned to limit debris from entering the air intake.

In yet another aspect of the invention, a self-cleaning filter assembly for use in an off-road vehicle is provided. The self-cleaning filter comprises an alternator including a fan for drawing air into the alternator, the alternator having an air intake side from which air is drawn into the alternator, and an air outtake side from which air is expended from the alternator. A filter support is coupled to the air intake side, and extending from the air intake side to support a flexible mesh filter. The flexible mesh filter is coupled to the air intake side of the alternator to filter air entering the alternator, and is provided over the filter support wherein the filter support prevents the flexible mesh filter from being drawn into the alternator.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
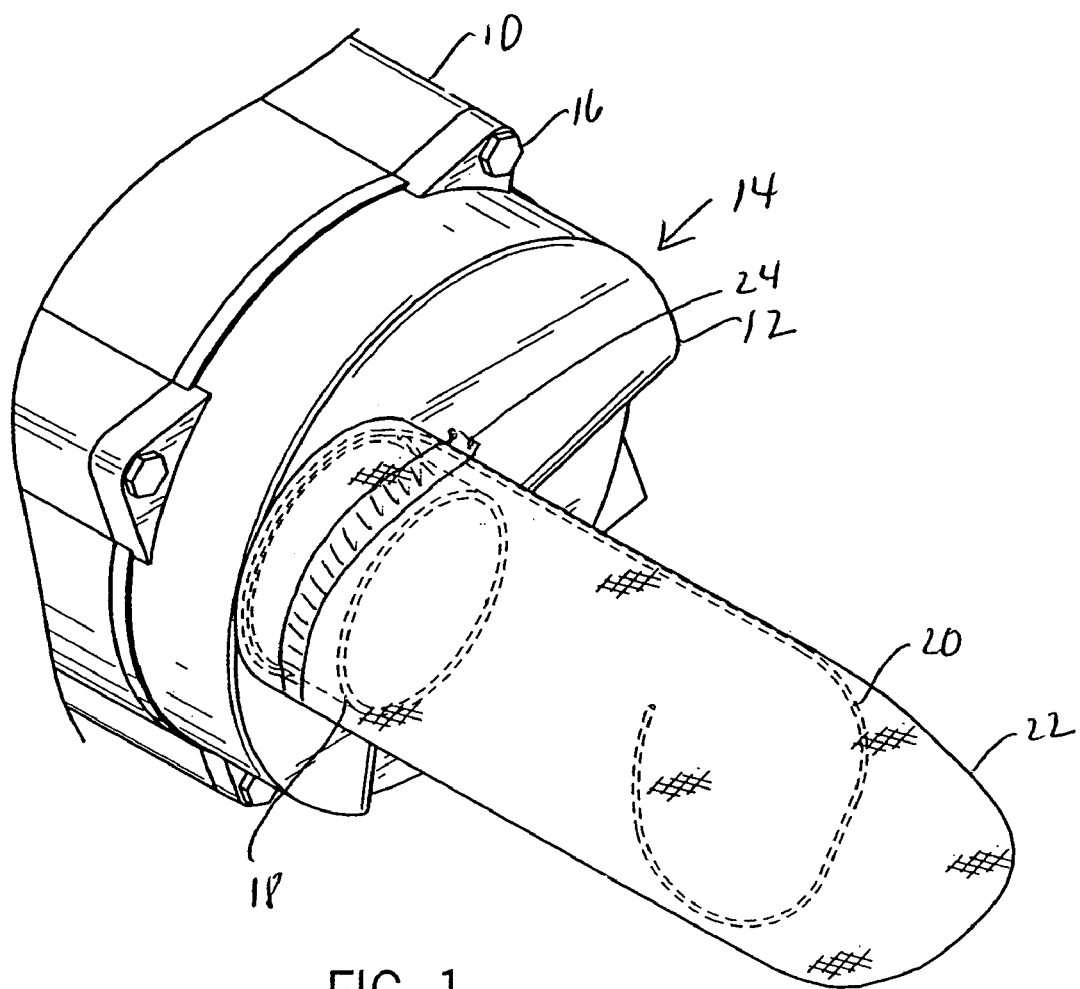
FIG. 1 is a perspective view of an alternator assembly constructed in accordance with the present invention.

Referring now to the figures and more particularly to FIG. 1 an alternator assembly 14 constructed in accordance with the present invention is shown. The alternator assembly 14 comprises an alternator 10 to which a cover 12 is coupled with threaded fasteners 16. The cover 12 includes an air intake port 18 to which a filter support 20 is coupled. A flexible elongate mesh sleeve 22 is positioned over and coupled to the filter support 20 by means of a clamp 24 sized and dimensioned to extend over the air intake 18 and the elongate mesh sleeve 22 and to lock the sleeve 22 in place. The alternator 10 includes an internal fan (not shown) which draws air through an air intake side of the alternator 10 behind the air intake port 18 and into the alternator 10 to cool the internal components during operation. Air is then expended out of the opposing side of the alternator, out of an outtake side of the alternator 10. As described below, in operation, the flexible elongate mesh sleeve 22 filters chaff and other material which would otherwise enter the alternator 10. The sleeve 22 is self-cleaning, as vibrations in the engine caused, for example, by the engine fan, cause the flexible sleeve to "wave" in the wind, or vibrate, shaking collected chaff from the sleeve 22, also as described below.

Figure 5:
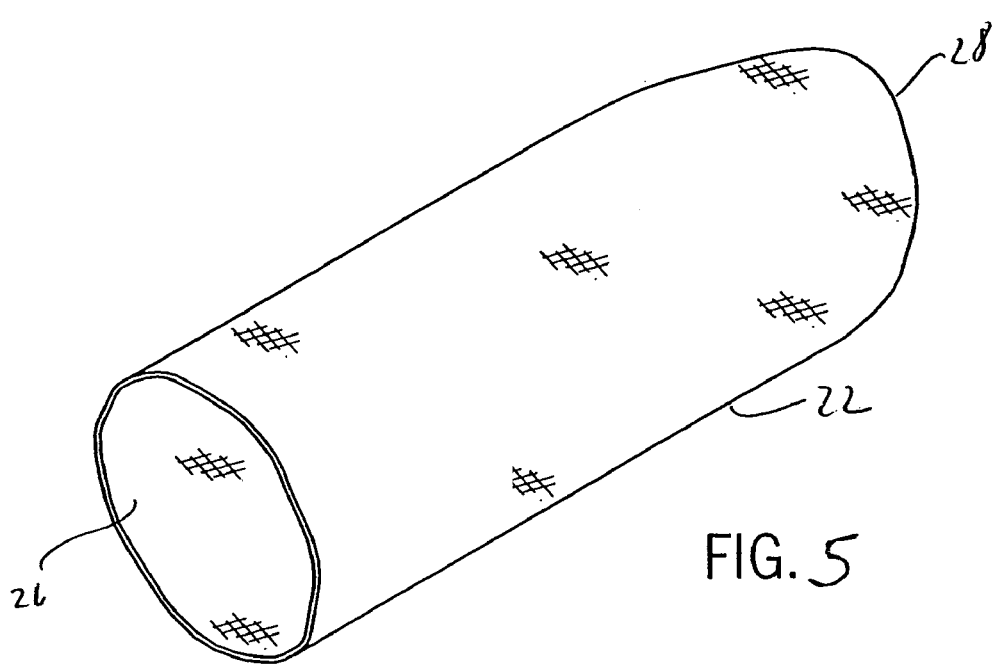
FIG. 5 is a perspective view of the filter sleeve of FIG. 1.

Referring now to FIG. 5 the elongate mesh sleeve 22 comprises a first open end 26 sized and dimensioned to extend around the air intake 18 of FIG. 1 and an opposed closed end 28. The elongate mesh sleeve 22 is constructed of a material which can be, for example, a flexible mesh or screen including a plurality of apertures which are sized and dimensioned to prevent extraneous chaff and other material from entering the air intake 18 of the cover 12 in the alternator assembly 14, and thereby to allow air to enter while preventing chaff and other extraneous material from entering the alternator 10. The elongate mesh sleeve 22 is constructed to be as long as possible, while allowing for placement in the engine compartment as discussed below. The greater the number of square inches in the sleeve 22, the more effective the sleeve 22 is at filtering materials. Furthermore, as the size increases, the shaking or vibrating of the screen increases, resulting in improved cleaning of the screen.

The flexible mesh sleeve 22 is preferably constructed of a material selected to withstand underhood operating temperatures, which are typically in the range of 100 to 180° F., and which is sufficiently flexible to be vibrated by forces within the engine compartment to cause extraneous material to be vibrated or "shook" from the sleeve. Although a number of different types of material could be used for producing the sleeve 22, in a preferred embodiment, the mesh is constructed of a polyester or nylon material. To provide appropriate filtering the mesh will include a hole size in a range extending from about 25 to 500 microns, and preferably in the range extending from 100 to 25 microns. The thread diameter is selected to be small enough of the screen material to flex, but large enough to prevent the screen from breaking. A thread diameter in the thousandths of inches, for example, has been shown experimentally to be appropriate for the application. These parameters have been shown experimentally to provide a sufficiently small hole size to filter most chaff from entering the alternator, while providing efficient air flow, and sufficient flexibility to provide the self-cleaning function. However, these parameters can be varied depending on the level of vibration, materials selected, and other variables.

Figure 2:
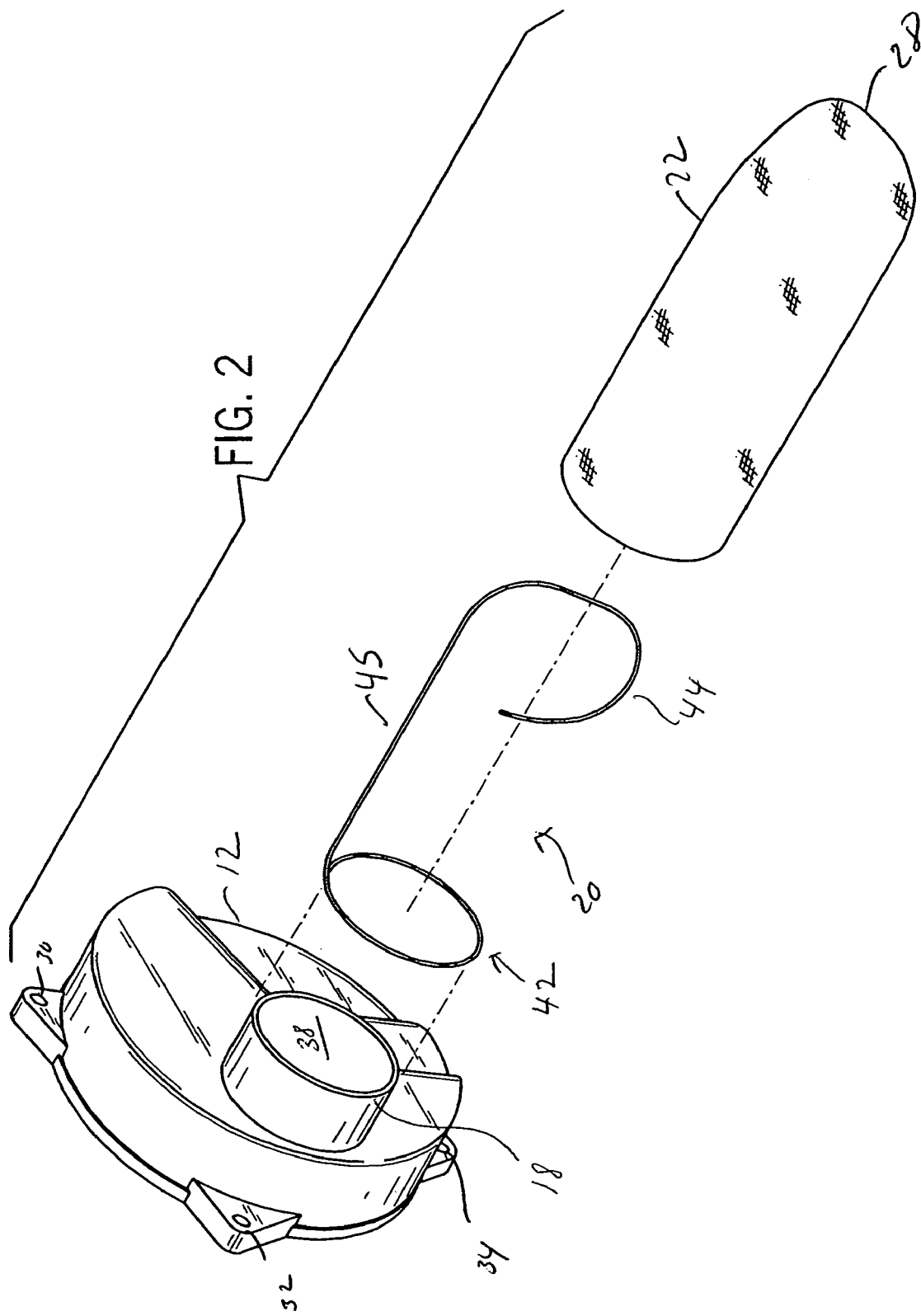
FIG. 2 is an exploded view of the alternator filtering assembly of FIG. 1.
Figure 3:
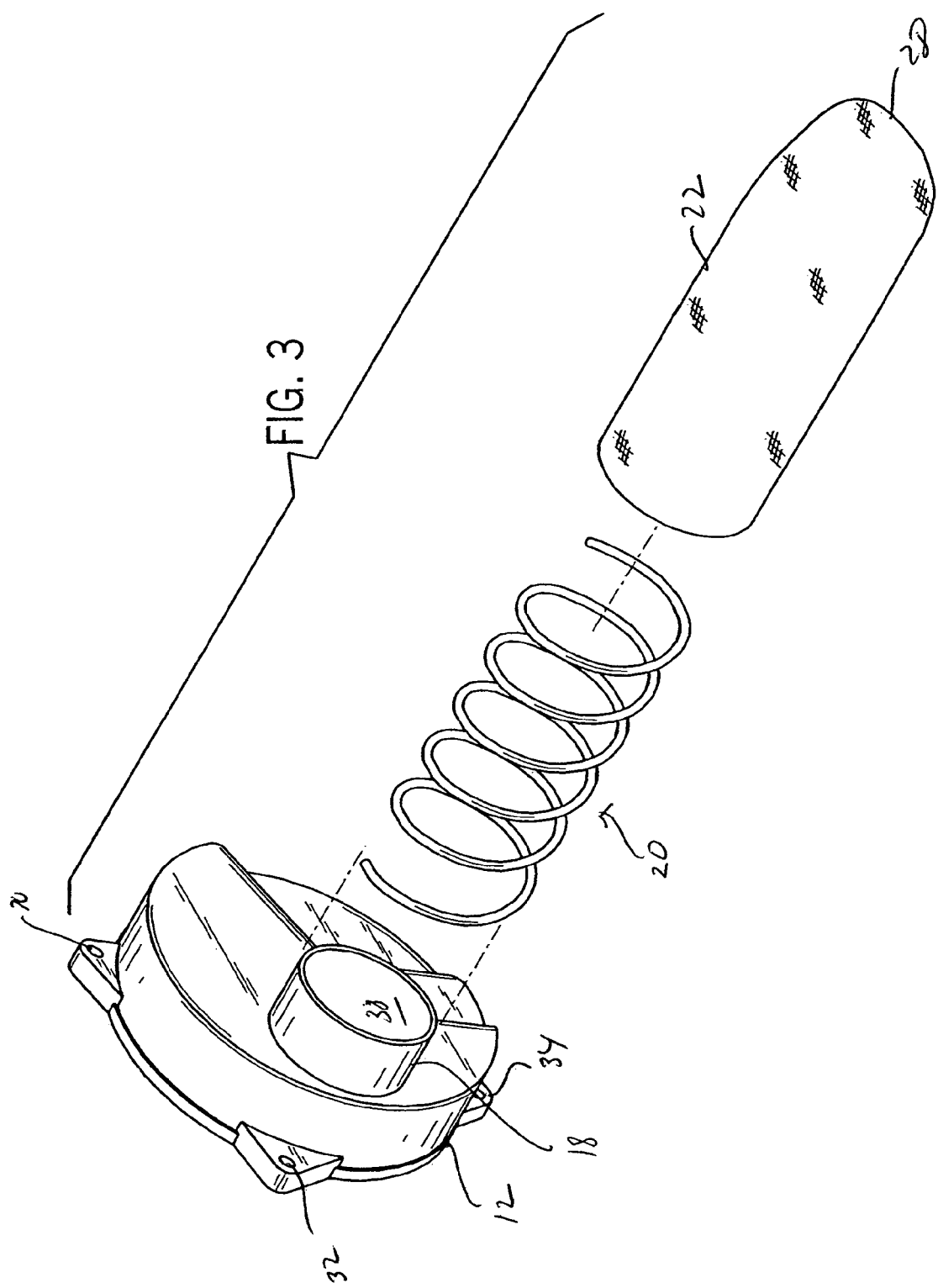
FIG. 3 is an exploded view of the alternator filtering assembly illustrating an alternate filter supporting FIG. 4.
Figure 4:
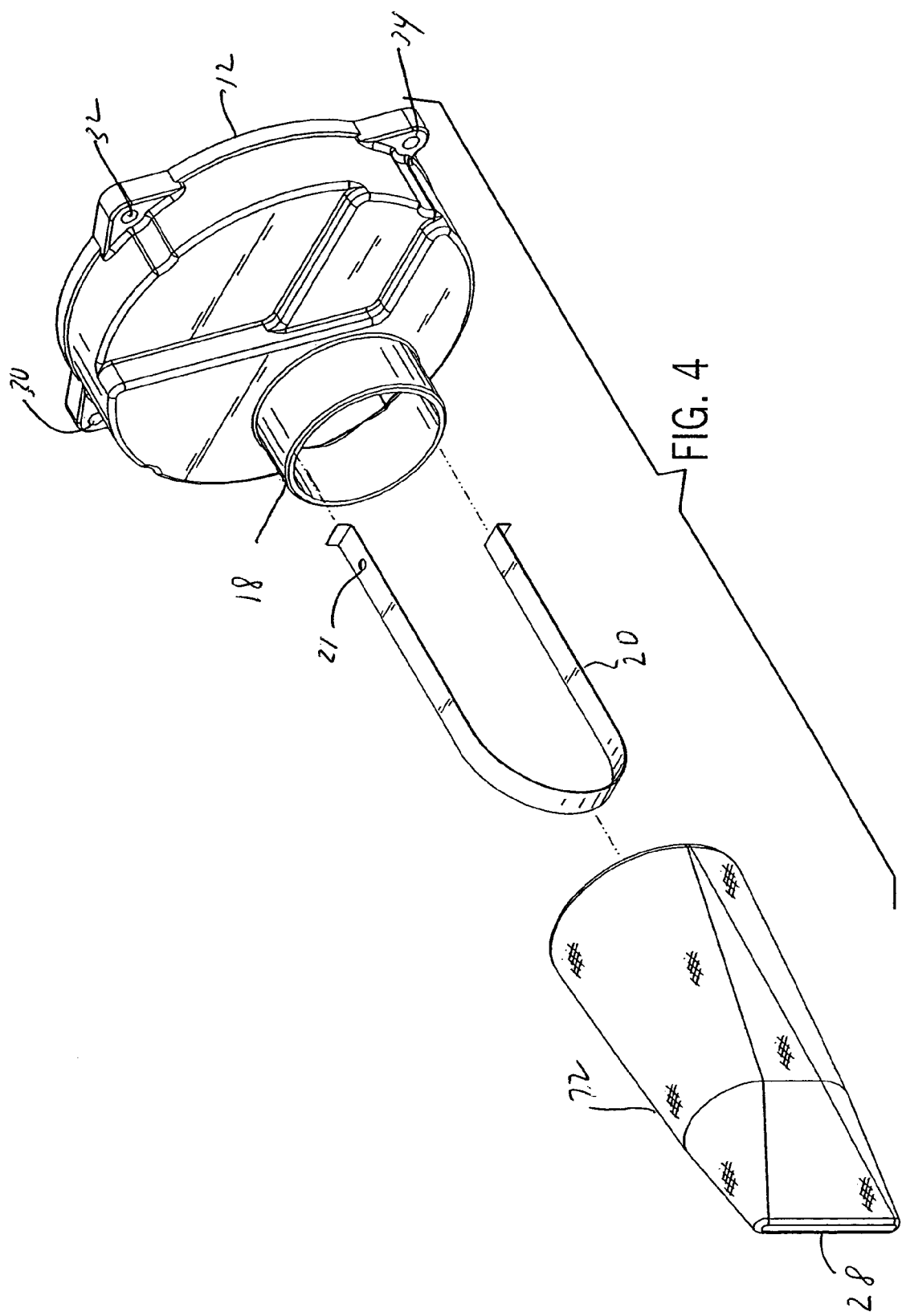
FIG. 4 is an exploded view of the alternator filtering assembly illustrating an alternate filter supporting FIG. 5.

Referring now to FIGS. 2–4 an exploded view of a first embodiment of an assembly 14 constructed in accordance with the present invention is shown. The filter assembly 14 comprises the cover 12 which includes mounting tabs 30, 32, and 34 including apertures for receiving threaded fasteners 16 coupling the cover 12 to the alternator 10 as shown in FIG. 1. As described above, the alternator cover 12 includes an air intake port 18 which is substantially cylindrical in shape and has an open end 38 through which air can flow toward the alternator 10. Although shown as including a cover 12, the filter assembly can also include a support 20 coupled directly to the air intake side of the alternator 10.

Referring now to FIG. 2, the filter support 20 can be constructed of a malleable wire material and includes a connector end 42 in the form of a circular connector sized and dimensioned to be received on the air intake 18. From the connector end 42, the wire support extends away from the cover 12, through an elongate section 45, and then loops to form a hook at the opposing end 44. The length of the elongate section 45 to extend substantially from the open end 26 to the closed end 28 of the filter sleeve 22, and therefore to maintain the sleeve 22 extending away from the cover 12, preventing the sleeve 22 from being drawn into the alternator 10.

Referring now to FIG. 3, an alternative embodiment of the filter assembly 14 is shown. Here, the filter support 20 is a coiled spring sized and dimensioned to be coupled to the air intake port 18. The coiled spring construction both prevents the sleeve 22 from being pulled back into the alternator 10, as described above, and can further enhance vibration of the sleeve. Referring now to FIG. 4, an alternative, preferred embodiment of a filter support 20 as shown. Here the filter support 20 is generally U-shaped and is sized and dimensioned such that the legs of the support 20 fit within the inner circumference of the air intake 18. The filter support 20 can include one or more aperture 21 which can receive a threaded fastener, rivet or other fastening devices for fastening the filter support 20 to the cover 12. Alternatively, the legs of the U-shaped bracket can be snap fit into the air intake port 18. As shown in FIG. 4, the filter sleeve 22 can be dimensioned for the selected support. Here, for example, the sleeve 22 tapers as it approaches the closed end such that the closed end 28 is sized and dimensioned to fit snuggly over the support 20.

Although a support member 20 having a specific construction has been described, various methods of coupling the filter mesh screen 22 to the cover 12 will be apparent. Support members 20 can be provided, for example, in the form of various types of sheet metal constructions could be formed as part of the cover 12, or stiff, flexible materials which prevent vibrations. Additionally, as described above, although the alternator assembly 14 is shown to include a cover 12, the alternator 10 can also be used without a cover. In this application the filter support member can be coupled directly to the alternator 10, and the filter sleeve 22 and associated clamp 24 are sized and dimensioned to fit over the outer circumference of the alternator 10, or over a smaller air intake oven, depending on the construction of the alternator.

Figure 6:
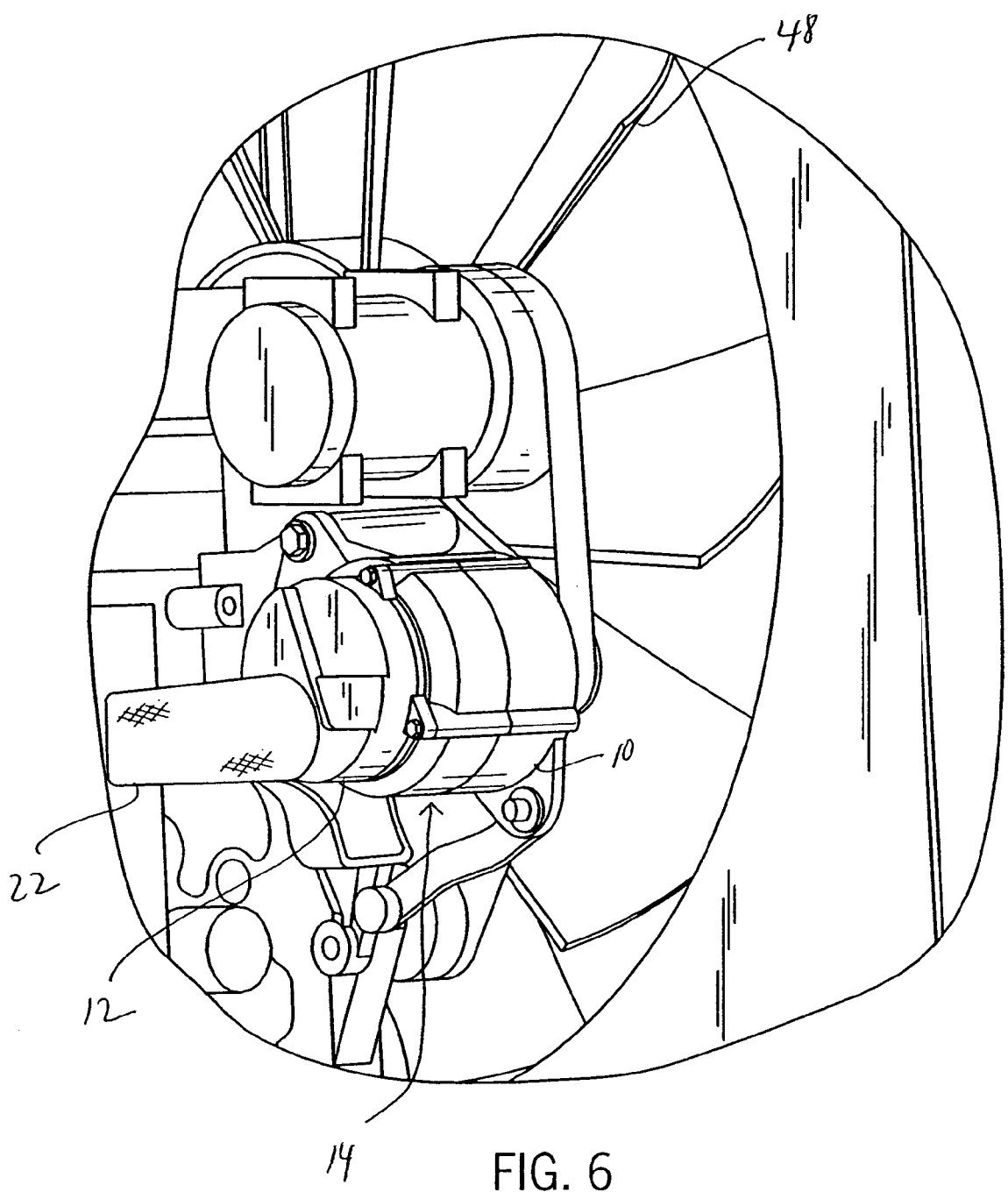
FIG. 6 is a partial perspective view of the inside of the engine compartment illustrating the placement of the alternator assembly of FIG. 1.

Referring now to FIG. 6, the alternator assembly 14 is shown as installed in the engine compartment 48 of an agricultural combine, crop harvesting machine, or other vehicle used in a "dirty" environment in which particulate matter capable of clogging the alternator 10 is found. The engine compartment 48 typically includes an engine fan 46 which provides an air flow through the engine compartment 48.

During operation, as the internal fan (not shown) of the alternator 10 pulls air into the intake side of the alternator 10, chaff and other material collects on the elongated mesh sleeve 22. The engine fan 46 blows air through the engine compartment 48 vibrating the filter sleeve 22 such that the collected material can be dislodged from the sleeve 22, thereby providing the self-cleaning function, limiting the possibility of clogging the filter, and decreasing the need for maintenance. During operation, the filter support member 20 prevents the sleeve 22 from being pulled toward the air intake port 18 and drawn into the alternator 10 by the operation internal fan.

Although, as shown here, the filter sleeve 22 is caused to vibrate by the engine fan and related engine compartment vibrations, the sleeve could also be vibrated in a number of other ways. For example, mechanical devices, including springs, mechanical arms, or other devices, could be provided to shake and/or apply intermittent forces to the filter sleeve 22 to shake the accumulated particulate matter from the filter sleeve 22. Furthermore, while a specific filter support 20 is shown and described, a number of different types of supports could be used, as described above. The filter support 20 and filter sleeve 22, furthermore, can be provided either in conjunction with a cover 12 or directly on the intake side of the alternator 10.

It should be understood therefore that the methods and apparatuses described above are only exemplary and do not limit the scope of the invention, and that various modifications could be made by those skilled in the art that would fall under the scope of the invention. To apprise the public of the scope of this invention, the following claims are made:

The invention claimed is:

1. A method for filtering the air intake of an alternator, the method comprising the following steps:
   coupling a wire support to an air intake of the alternator, the wire support extending away from the air intake, wherein the wire support has an elongate section and a distal end curved to form a hook;
   coupling an elongate flexible mesh sleeve to the wire support such that the elongate flexible mesh sleeve encloses the air intake, the mesh being sized and dimensioned to limit entry of extraneous material to the alternator; and
   periodically vibrating the elongate mesh sleeve to force filtered material loose from the outside of the sleeve.

2. The method as defined in claim 1, further comprising the step of constructing the sleeve from a material having apertures in a range extending between twenty-five and five hundred microns.

3. The method as defined in claim 1, further comprising the step of constructing the sleeve to maximize the number of square inches of exposed material.

4. The method as defined in claim 1, wherein the step of vibrating the sleeve is provided by blowing air through the sleeve from the engine fan.

5. The method as defined in claim 1, further comprising the step of coupling a cover including an air intake port between the alternator and the wire support.

6. The method as defined in claim 1, further comprising the step of constructing the sleeve from a material having apertures in a range extending between one hundred and two hundred and fifty microns.

7. A self-cleaning filter for an alternator air intake, the filter comprising:
   an elongate wire support having a connector end sized and dimensioned to be received on the alternator air intake, the filter wire support extending away from the air intake, the wire support having an elongate section and a hook on a distal end thereof; and
   an elongate flexible sleeve having an open end sized and dimensioned to be received on the elongate wire support and over the air intake of the alternator and an opposing closed end, the elongate flexible sleeve being constructed of a mesh filter material, the apertures in the mesh being sized and dimensioned to limit debris from entering the air intake.

8. The filter as defined in claim 7, further comprising a clamp for coupling the sleeve to the air intake.

9. The filter as defined in claim 7, wherein the elongate filter wire support comprises a U shaped member sized and dimensioned to be complied to the air intake.

10. The filter as defined in claim 7, wherein the elongate wire support comprises a coiled spring.

11. The filter as defined in claim 7, wherein the mesh is selected to include apertures in a range extending between twenty-five and five hundred microns.

12. The filter as defined in claim 7, wherein the mesh is sized and dimensioned to allow air flow through the alternator while blocking particulate matter.

13. The filter as defined in claim 7, wherein the mesh is constructed from a thread having a diameter in the thousandths of inches.

14. A self-cleaning filter assembly for use in an off-road vehicle, the self-cleaning filter comprising:
   an alternator including a fan for drawing air into the alternator, the air alternator having an air intake side from which air is drawn into the alternator, and an air outtake side from which air is expended from the alternator;
   a wire support having one end coupled to the air intake side, wherein the wire support has an elongate section extending away from the air intake side, and further wherein a distal end of the wire support curves to form a hook;
   a flexible mesh filter coupled to the air intake side of the alternator to filter air entering the alternator, the flexible mesh filter being provided over the wire support wherein the wire support prevents the mesh filter from being drawn into the alternator.

15. The self-cleaning filter assembly as defined in claim 14, wherein the mesh is selected to have apertures in a range extending from about one hundred and twenty-five to about five hundred microns.

16. The self-cleaning filter assembly as defined in claim 14, wherein the mesh is selected to be constructed of threads having a diameter in the thousandths of inches.

17. The self-cleaning filter assembly as defined in claim 14, wherein the alternator assembly is positionable in an engine compartment including an engine fan, the engine fan vibrating the filter sleeve to cause filtered material to be forced from the sleeve.

18. The method as defined in claim 1, further comprising the step of forming the wire support into a desired shape.

19. The filter as defined in claim 7, wherein the length of the elongate section extends substantially from the open end to the closed end of the sleeve to maintain the sleeve extending away from the air intake.

20. The filter as defined in claim 7, wherein the wire is malleable such that the wire support can be formed into a desired shape.

21. The filter as defined in claim 20, wherein the connector end is bent to form a circular shape.

22. The self-cleaning filter assembly as defined in claim 14, wherein the length of the elongate section extends substantially the length of the sleeve to maintain the sleeve extending away front the air intake side.

23. The self-cleaning filter assembly as defined in claim 14, wherein the wire support is malleable such that the wire support can be formed into a desired shape.

* * * * *